United States Patent
Lienkamp et al.

(10) Patent No.: US 8,450,021 B2
(45) Date of Patent: May 28, 2013

(54) METHOD FOR HV BUS VOLTAGE CONTROL IN FUEL CELL VEHICLES FEATURING HV LITHIUM BATTERIES

(75) Inventors: Sebastian Lienkamp, Budenheim (DE); Stephen Raiser, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 568 days.

(21) Appl. No.: 12/724,170

(22) Filed: Mar. 15, 2010

(65) Prior Publication Data

US 2011/0223506 A1    Sep. 15, 2011

(51) Int. Cl.
*H01M 8/04* (2006.01)
*G05F 1/00* (2006.01)
*H02M 3/156* (2006.01)

(52) U.S. Cl.
USPC ............ 429/432; 323/273; 323/282; 323/351

(58) Field of Classification Search
USPC .................. 429/400–535; 323/280, 273, 282, 323/351; 180/65.21, 165; 307/31, 2, 10.1; 700/286; 320/140, 156–157; 396/206; 363/13
See application file for complete search history.

(56) References Cited

U.S. PATENT DOCUMENTS

| | | | |
|---|---|---|---|
| 6,946,822 B2 * | 9/2005 | Cincinelli et al. | 323/282 |
| 2003/0090246 A1 * | 5/2003 | Shenai et al. | 323/259 |
| 2004/0124816 A1 * | 7/2004 | DeLepaut | 323/282 |
| 2005/0073289 A1 * | 4/2005 | Takada et al. | 323/282 |
| 2006/0145677 A1 * | 7/2006 | Okamura | 323/283 |
| 2008/0076012 A1 * | 3/2008 | Lienkamp et al. | 429/65 |
| 2008/0138680 A1 * | 6/2008 | Hu et al. | 429/23 |
| 2009/0011301 A1 * | 1/2009 | Matsumoto et al. | 429/23 |
| 2009/0315698 A1 * | 12/2009 | Berdichevsky et al. | 340/455 |

* cited by examiner

*Primary Examiner* — Patrick Ryan
*Assistant Examiner* — Kiran Quraishi
(74) *Attorney, Agent, or Firm* — John A. Miller; Miller IP Group, PLC

(57) ABSTRACT

A system for reducing oscillations on a high voltage bus. The system includes a high voltage battery electrically coupled to the high voltage bus and a DC/DC boost converter electrically coupled to the high voltage bus and a fuel cell stack. The DC/DC converter includes a current controller that selectively controls the current provided by the fuel cell stack. A system controller provides a stack current set-point to the DC/DC converter. The DC/DC converter includes a voltage device that receives a voltage signal from the bus and provides a time derivative of the voltage signal that defines voltage changes on the bus over time. The time derivative signal is provided to a summer that adjusts the current stack set-point to provide a modified current set-point to the current controller that selectively adjusts the current provided by the fuel cell stack to dampen oscillations on the high voltage bus.

11 Claims, 2 Drawing Sheets

METHOD FOR HV BUS VOLTAGE CONTROL IN FUEL CELL VEHICLES FEATURING HV LITHIUM BATTERIES

BACKGROUND OF THE INVENTION

1. Field of the Invention

This invention relates generally to a system and method for reducing disturbances on a high voltage bus in a fuel cell system including a high voltage battery and, more particularly, to a system and method for reducing disturbances on a high voltage bus in a fuel cell system including a high voltage battery, where the system also includes a DC/DC boost converter that calculates a time derivative of the bus voltage to adjust a stack current set-point.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Most fuel cell vehicles are hybrid vehicles that employ a supplemental power source in addition to the fuel cell stack, such as a high voltage DC battery or an ultracapacitor. The power source provides supplemental power for the various vehicle auxiliary loads, for system start-up and during high power demands when the fuel cell stack is unable to provide the desired power. The fuel cell stack provides power to an electrical traction motor through a DC high voltage electrical bus for vehicle operation. The battery provides supplemental power to the electrical bus during those times when additional power is needed beyond what the stack can provide, such as during heavy acceleration. For example, the fuel cell stack may provide 70 kW of power. However, vehicle acceleration may require 100 kW of power. The fuel cell stack is used to recharge the battery or ultracapacitor at those times when the fuel cell stack is able to provide the system power demand. The generator power available from the traction motor during regenerative braking is also used to recharge the battery or ultracapacitor.

In the hybrid vehicle discussed above, a bi-directional DC/DC converter is sometimes employed to match the battery voltage to the voltage of the fuel cell stack.

Typically, each high voltage component in the electrical architecture of a fuel cell system includes an input capacitance that acts as a low pass filter to filter the disturbances on the high voltage bus to reduce their affect. Generally, in order to reduce the disturbances on the high voltage bus to a suitable level, a relatively high capacitance is needed in each component coupled to the high voltage bus, which increases the cost of the system, increases the size of the system, increases the weight of the system, etc. Further, higher capacitances present a potential problem when the system is shut down because those capacitances may need to be discharged. Therefore, it is desirable to reduce the size of the capacitance in the high voltage electrical architecture of a fuel cell system to be as small as possible.

In one fuel cell system design, the electric traction motors and other miscellaneous loads operate on the voltage determined by the fuel cell stack. The difference between the fuel cell stack voltage and the battery voltage is provided by a DC/DC converter that couples the battery to a high voltage bus connecting the fuel cell stack to other high voltage components. Any disturbances on the bus will be filtered by the input capacitance of the various devices, which are rather small, and the inherent capacitance of the fuel cell stack, which is relatively large. The converter will not pass the disturbances to the battery because of its inherent behavior and the various system set-points from the high level system controller will be too slow to react to the disturbances.

Other fuel cell system designs operate on the voltage determined by the battery, where those components are electrically coupled to the high voltage bus between the DC/DC converter and the high voltage battery. The DC/DC converter connects the fuel cell stack to the high voltage bus. In this design, any disturbances on the bus will also be filtered by the input capacitance of the various devices and the inherent capacitance of the battery. However, the high ohmic resistance of the battery at very low temperatures decouples the battery's capacitance from the high voltage bus and reduces its ability to provide the dampening effect of the battery. Further, the high inductance of the cables coupled to the battery or the battery internal current routing further suppresses any damping effect. The converter will not pass the disturbances from the fuel cell stack because of its inherent behavior and the various system set-points from the high level system controller will be too slow to react to the disturbances. Thus, these disturbances would drive big voltage fluctuations on the high voltage bus.

SUMMARY OF THE INVENTION

In accordance with the teachings of the present invention, a system and method are disclosed for reducing oscillations on a high voltage bus. The system includes a high voltage battery electrically coupled to the high voltage bus and a DC/DC boost converter electrically coupled to the high voltage bus and a fuel cell stack. The DC/DC converter includes a current controller that selectively controls the current provided by the fuel cell stack. A system controller provides a stack current set-point to the DC/DC converter. The DC/DC converter includes a voltage device that receives a voltage signal from the bus and provides a time derivative of the voltage signal that defines voltage changes on the bus over time. The time derivative signal is provided to a summer that adjusts the current stack set-point to provide a modified current set-point to the current controller that selectively adjusts the current provided by the fuel cell stack to dampen oscillations on the high voltage bus.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for reducing oscillations and disturbance on a high voltage bus is merely exemplary in nature, and is in no way intended to limit the invention or its applications or uses.

Figure 1:
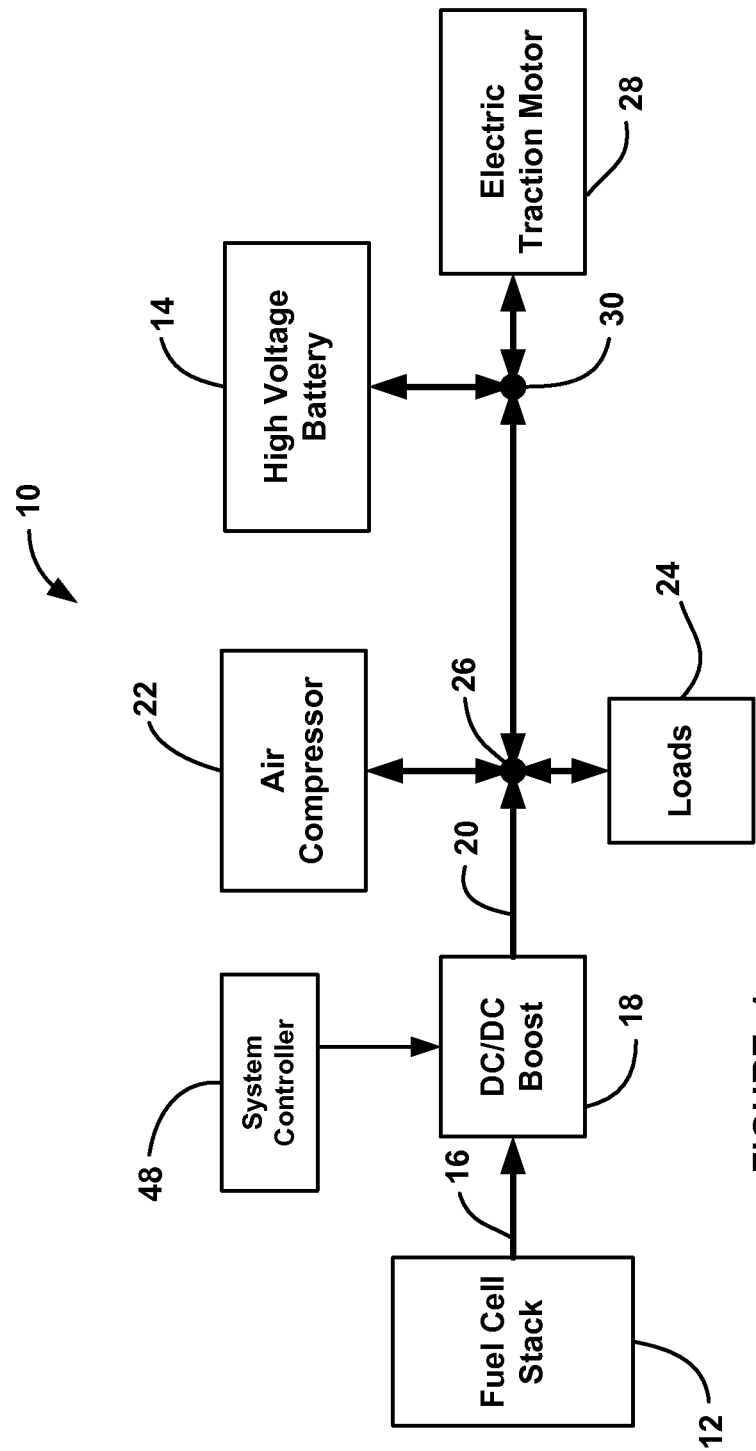
FIG. 1 is a schematic block diagram of a fuel cell system including a high voltage bus and a DC/DC boost converter.

FIG. 1 is a schematic block diagram of a fuel cell system 10 including a fuel cell stack 12 and a high voltage battery 14. The battery 14 can be any suitable rechargeable battery system that provides various desirable charging and discharging characteristics for fuel cell system applications, including, but not limited to, lithium-ion batteries, Ni-MH batteries, sodium-nickel-chloride batteries, lead-acid batteries, nickel-cadmium batteries, etc. Although a battery is employed in this non-limiting embodiment as a supplemental power source, other high voltage DC storage devices can be employed instead of the battery 14, such as an ultracapacitor.

The fuel cell stack 12 and the battery 14 may have different output voltages, depending on their design and the actual load current. A DC/DC boost converter 18 provides voltage matching between the stack 12 and the battery 14, and provides current control that selectively determines how much power is provided by the stack 12 to drive the various loads and the electric traction motor for the changing fuel cell system conditions and driver requests.

In this design, the fuel cell stack 12 is electrically coupled to the DC/DC boost converter 18 by a stack bus 16 and the DC/DC boost converter 18 is coupled to the high voltage battery 14 by a high voltage bus 20. The various high voltage components of the system 10 are electrically coupled to the high voltage bus 20 between the boost converter 18 and the battery 14. Particularly, an air compressor 22 for providing an airflow to the cathode side of the fuel cell stack 12 and miscellaneous system loads 24 are electrically coupled to the high voltage bus 20 at node 26. Further, an electric traction motor 28, along with the high voltage battery 14, are electrically coupled to the high voltage bus 20 at node 30.

A high level system controller 48 commands a current to the DC/DC boost converter 18 based on the wheel torque requested by the driver, the fuel cell stack and battery status and the particular hybrid strategy. The converter 18 controls the boost internal transistor switches such that the boost input current, which is equal to the fuel cell output current, matches the command.

Using this control strategy, if a high voltage bus limit below the battery voltage limit is detected, the fuel cell media flows are adjusted to be able to draw more current from the fuel cell stack 12. Thus, the boost converter 18 delivers more power to the bus 20 and less power is drawn from the battery 14, whose voltage will then rise instantaneously. Other mitigations could be to reduce the power consumption of the traction system. For the case of too high of a bus voltage during regenerative braking, the braking torque of the traction system would be reduced accordingly. However, the control loops discussed above that include the high level system controls are too slow to counteract fast high voltage bus disturbances. This is due to delays in CAN messaging and limited system controller update rates. These restrictions do not apply to a control loop completely encapsulated inside the boost converter 18 and its very fast own control loops.

Figure 2:
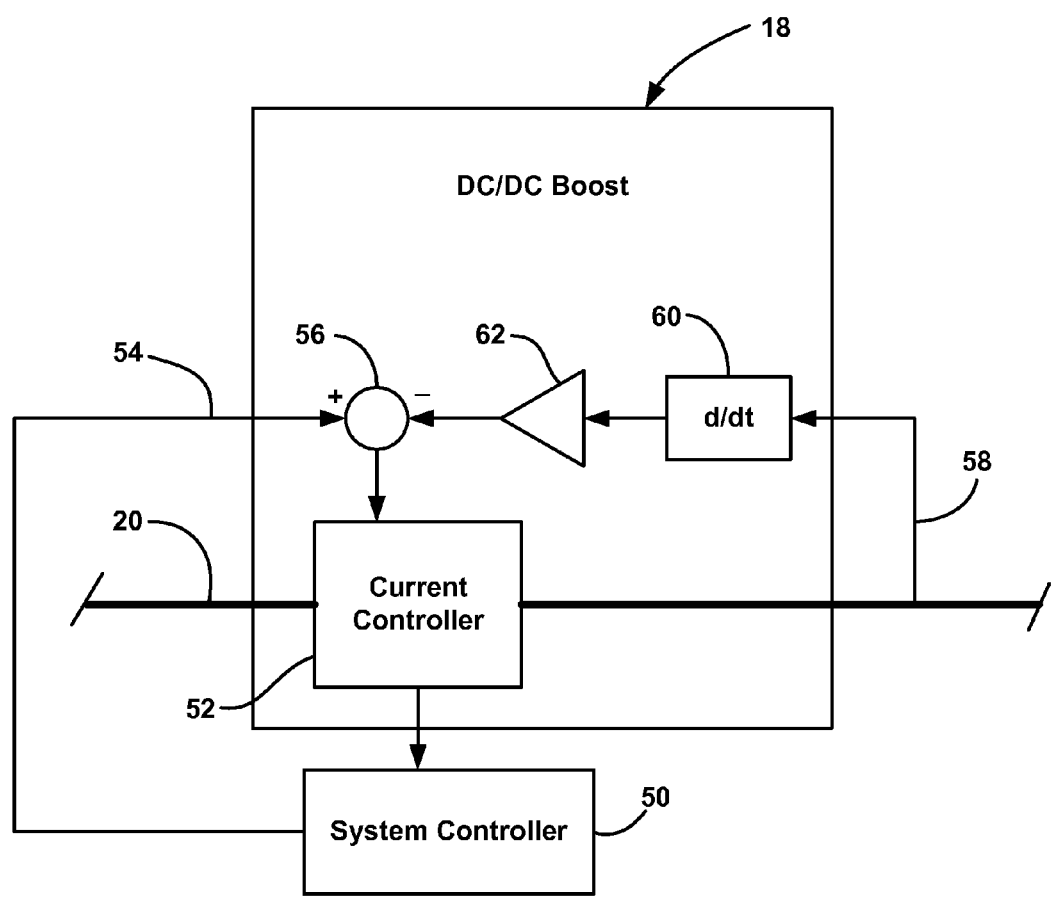
FIG. 2 is a schematic block diagram of the DC/DC boost converter shown in FIG. 1.

FIG. 2 is a schematic block diagram of the DC/DC boost converter 18 in the system 10 showing an electrical energy buffer. The DC/DC converter 18 includes a current controller 52 that sets the amount of current on the high voltage bus 20 that will be provided by the stack 12. The DC/DC converter 18 receives a current set-point signal from a system controller 50 on line 54 that is determined by the driver request, such as accelerator pedal position.

The various oscillations and disturbances that occur on the high voltage bus 20 as a result of loads being connected and disconnected, and other factors, can be dampened or reduced by adjusting the stack current set-point signal provided to the current controller 52 in response to the oscillations. A voltage signal from the high voltage bus 20 provided on line 58 is sent to a voltage measuring circuit 60 that calculates a time derivative of the voltage signal. The time derivative is a value that defines the rate of change of the voltage from one point in time to a next point in time. The time derivative value thus identifies voltage changes on the high voltage bus 20 that define the oscillations and disturbances on the bus 20. This time derivative value is amplified by an amplifier 62 and the amplified time derivative value is sent to a summing junction 56 along with the current set-point signal from the system controller 50. The time derivative value off-sets or modifies the current set-point signal depending on the magnitude of the disturbances based on the changes in voltage. If there are no voltage gradients on the high voltage bus 20, then the time derivative value is zero and the current set-point signal is not adjusted.

The adjusted current set-point signal from the summing junction 56 is then sent to the current controller 52. The current controller 52 provides power oscillations to the bus 20 that counteract the oscillations on the high voltage bus 20 from the electrical components. The variation in the fuel cell stack current will cause an oscillation of the stack bus voltage, but the stack bus voltage will be dampened by the high inherent fuel cell stack capacitance. Thus, the overall stack capacitance is used as an additional capacitance for the high voltage bus 20 without adding significant costs to the system 10.

In current fuel cell system technology, the battery 14 may be a lithium-ion battery, which has various sensitivities. For systems that are required to operate at very cold temperatures, such as down to −30° C., the internal resistance of the battery 14 may increase by an order of magnitude at these temperatures.

As will be appreciated by those skilled in the art, the present invention will have application for other electrical systems where a DC/DC boost connects to busses with different voltage levels other than fuel cell vehicle applications.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a high voltage bus;
    a fuel cell stack electrically coupled to the high voltage bus by a DC/DC boost converter, said DC/DC converter including a current controller that controls the current provided by the fuel cell stack, said DC/DC converter further including a voltage device that receives a voltage signal from the high voltage bus, said voltage device providing a time derivative of the voltage signal that defines voltage changes on the bus over time;
    a high voltage power source electrically coupled to the high voltage bus; and
    a system controller providing a stack current set-point to the DC/DC converter, said DC/DC converter further including a summer that changes the current stack set-point using the time derivative signal and provides an off-set signal to the current controller that selectively adjusts the current provided by the fuel cell stack to dampen oscillations on the high voltage bus.

2. The system according to claim 1 further comprising an electric traction motor electrically coupled to the high voltage bus.

3. The system according to claim 1 wherein the DC/DC converter further includes an amplifier for amplifying the time derivative signal before it is added to the current set-point signal.

4. The system according to claim 1 wherein the power source is a high voltage battery.

5. The system according to claim 4 where the battery is a lithium-ion battery.

6. The system according to claim 4 wherein the battery is selected from the group consisting of lithium-ion batteries, Ni-MH batteries, sodium-nickel-chloride batteries, lead-acid batteries and nickel-cadmium batteries.

7. The system according to claim 1 wherein the system is a fuel cell system on a vehicle.

8. A fuel cell system for a vehicle, said system comprising:
    a high voltage bus;
    a high voltage battery electrically coupled to the high voltage bus;
    an electric traction motor electrically coupled to the high voltage bus;
    a DC/DC boost converter electrically coupling a fuel cell stack to the high voltage bus, said DC/DC boost converter including a current controller that controls the current provided by the fuel cell stack, said DC/DC boost converter further including a voltage device that receives a voltage signal from the high voltage bus, said voltage device providing a time derivative of the voltage signal that defines voltage changes on the bus over time; and
    a system controller providing a stack current set-point to the DC/DC converter, said DC/DC converter further including a summer that changes the current stack set-point using the time derivative signal and provides an off-set signal to the current controller that selectively adjusts the current provided by the fuel cell stack to dampen oscillations on the high voltage bus.

9. The system according to claim 8 wherein the DC/DC converter further includes an amplifier for amplifying the time derivative signal before it is added to the current set-point signal.

10. The system according to claim 8 where the battery is a lithium-ion battery.

11. The system according to claim 8 wherein the battery is selected from the group consisting of lithium-ion batteries, Ni-MH batteries, sodium-nickel-chloride batteries, lead-acid batteries and nickel-cadmium batteries.

* * * * *